United States Patent Office 3,385,823
Patented May 28, 1968

3,385,823
CURABLE ORGANOPOLYSILOXANE
COMPOSITIONS
Joel Francis Di Paola, Danbury, Conn., assignor to
General Electric Company, a corporation of New
York
No Drawing. Filed Aug. 9, 1967, Ser. No. 659,307
10 Claims. (Cl. 260—46.5)

ABSTRACT OF THE DISCLOSURE

Curable organopolysiloxane compositions convertible to the elastomeric state at room temperature upon exposure to moisture comprising the reaction product of a polyuriedosilane, such as

and a silanol-terminated diorganopolysiloxane. The curable organopolysiloxane compositions are substantially free of odor and show superior metal to rubber adhesion when cure is effected in contact with a metal.

---

The present invention relates to a room temperature vulcanizing composition comprising a silanol-terminated diorganopolysiloxane and a polyuriedosilane.

As it is generally known to those skilled in the art, room temperature vulcanizing organopolysiloxane compositions, are classified as either two package, requiring the incorporation of curing catalyst immediately prior to use, or one package, where cure can be effected upon exposure of the composition to the atmosphere. Experience has shown that even though one package compositions eliminate the requirement of incorporating a curing catalyst into the composition prior to cure, they have several limitations. For example, it has been found that one package room temperature vulcanizing organopolysiloxane compositions often do not cure uniformly when utilized in thicknesses exceeding ¼". A tack-free surface, for example, may not indicate that a complete through cure has been achieved due to what is often referred to as the "skin effect." In addition, conventional moisture curable one package room temperature vulcanizing organopolysiloxane compositions, often emit undesirable odors resulting from the production of curing agent by-products, such as carboxylic acids, amines, etc.

The present invention is based on the discovery that certain uriedosilanes of the formula, (1)

can be utilized as a curing agent in combination with silanol-terminated organopolysiloxanes to provide for the production of one package, moisture curable, room temperature vulcanizing compositions, where R is selected from monovalent hydrocarbon radicals, halogenated monovalent hydrocarbon radicals and alkoxy radicals, R' is selected from monovalent hydrocarbon radicals and halogenated monovalent hydrocarbon radicals, R" is selected from hydrogen and R' radicals, and $a$ is equal to 0 or 1. It has been found that the compositions of the present invention can be cured in sections up to twice the thickness of prior art compositions for the same cure time. In addition, the compositions of the present invention are odorless. When unfilled, the compositions of the present invention show improved tensile strength compared to unfilled prior art room temperature vulcanized elastomers. Again, the resulting unfilled elastomer is found to exhibit improved metal to rubber adhesion when cure is effected in contact with metal, such as aluminum.

There is provided by the present invention, curable compositions comprising by weight (1) 100 parts of a silanol-terminated organopolysiloxane consisting essentially of chemically combined units of the formula, (2)

and (2) from 2 to 30 parts of uriedosilane of Formula 1, where R''' is selected from R' radicals, as previously defined, and cyanoalkyl radicals.

Radicals included by R, are for example, aryl radicals and halogenated aryl radicals such as phenyl, tolyl, chlorophenyl, naphthyl, etc., arylalkyl radicals, such as phenylethyl, benzyl, etc., aliphatic and cycloaliphatic radicals such as cyclohexyl, cyclobutyl, etc.; alkenyl and alkynyl radicals such as methyl, ethyl, propyl, chloropropyl, vinyl, allyl, chloroallyl, trifluoropropyl, alkoxy radicals such as methoxy, ethoxy, propoxy, tert-butoxy, etc. Radicals included by R' are for example, all of the aforementioned R radicals except alkoxy. Radicals included by R" are hydrogen and R' radicals. Radicals included by R''' radicals are R' radicals and cyanoalkyl radicals such as cyanoethyl, cyanopropyl, cyanobutyl, etc. In the above formula where R, R', R" and R''' can be more than one radical, these radicals can be the same or any two or more of the aforementioned radicals respectively.

Uriedosilanes included by Formula 1 are for example, tris(N,N - dimethyl - N' - methyluriedo)methylsilane; tris(N - methyl - N' - phenyluriedo)methylsilane; bis(N,N - dimethyl - N' - allyluriedo)methylsilane; tris (N,N - methyl, isopropyl - N' - methyluriedo)tert - butoxysilane; bis(N,N - diethyl - N' - phenyluriedo)methylsilane, etc.

Uriedosilanes of Formula 1, and a method for making them are shown in my copending application Serial Number 659,293 filed concurrently herewith and assigned to the same assignee as the present invention. For example, reaction can be effected between an aminosilane and an organoisocyanate as shown by the following equation, $$RH_aSi(NR'R'')_{3-a} + R'NCO \rightarrow \text{Formula 1}$$

Included by the silanol-terminated organopolysiloxane consisting essentially of chemically combined units of Formula 2 are for example, linear diorganopolysiloxane of the formula, (3)

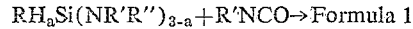

where R''' is as defined above and $n$ is an integer having an average value equal to about 5 to 3,000 inclusive. This fluid preferably has a viscosity in the range of from about 2,000 to 50,000 centipoises when measured at 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated diorganopolysiloxane of Formula 3 are well known. For example, hydrolysis of diorganohalosilane such as dimethyldichlorosilane, diphenyldichlorosilane, methylvinyldichlorosilane, etc. or mixtures thereof can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Preferably, such polymers are decatalyzed of equilibration catalyst by standard procedures prior to use, such as shown by Boot Patent 3,153,007, assigned to the same assignee as the present invention.

Silanol-terminated organopolysiloxanes having viscosities below 1200 centipoises can be made by treating organo polysiloxanes consisting essentially of chemically combined units of Formula 2 with steam under pressure. Other methods that can be employed to make silanol-terminated organopolysiloxanes are more particularly described in Patent 2,607,792—Warrick and U.K. Patent 835,790.

Various fillers and pigments can be incorporated in the silanol-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, etc. The amounts of filler used can obviously be varied within wide limits in accordance with the intended use. For example, in some sealant applications, the curable compositions of the present invention can be used free of filler. In other applications, such as the employment of the curable composition for making binding material, as much as 700 parts or more of filler, per 100 parts of organopolysiloxane can be employed. In such applications, the filler can consist of a major amount of extending materials, such as ground quartz, polyvinylchloride, etc., or mixtures thereof, preferably having an average particle size in the range of from about 1 to 10 microns. The compositions of the present invention also can be employed as construction sealants, caulking compounds, etc. The exact amount of filler therefore, will depend upon such factors as the application for which the organosiloxane composition is intended, the type of filler utilized (that is, the density of the filler, its particle size, etc.). Preferably, a proportion of from 10 to 300 parts of filler, which can include up to about 35 parts of a reinforcing filler, such as fumed silica filler, per 100 parts of silanol-terminated organopolysiloxane is utilized. In addition, the curable organopolysiloxane compositions of the present invention also can contain curing accelerators such as dibutyltindilaurate, carboxylic acid, salts of lead or zinc, etc.

In the practice of the invention, the curable organopolysiloxane compositions are made by mixing together a polyureidosilane, silanol-terminated organopolysiloxane, filler, etc., under substantially anhydrous conditions. The order of addition of the various ingredients is not critical. For example, the curing agent can be mixed directly with the silanol-terminated organopolysiloxane, followed by the addition of filler, or the curing agent can be added to the mixture of the filler and the silanol-terminated organopolysiloxane, etc. Optimum results have been achieved, if the resulting mixture has no more than 100 parts of water, per million parts of mixture. Preferably, mixing is accomplished in a temperature between 20° C. to 80° C.

After the curable organopolysiloxane composition is made, it can be stored for a substantial period of time if properly protected from moisture. The curable organopolysiloxane composition can remain in a fluid curable state for periods of two years or more if maintained at temperatures to 60° C. under substantially anhydrous conditions.

In order that those skilled in the art will be better able to practice the invention, the following examples are given by illustration and not by way of limitation. All parts are by weight.

Example 1

There is added under substantially anhydrous conditions 0.5 part of tris(N,N-dimethyl-N'-phenylureido)-methylsilane to 10 parts of a silanol-terminated diorganopolysiloxane consisting essentially of chemically combined dimethylsiloxy units, methylvinylsiloxy units and methylcyanoethylsiloxy units, having a viscosity of about 3,000 centipoises at 25° C. which is rapidly stirred. After the addition is completed, the resulting curable composition is exposed to atmospheric moisture. There is obtained a tack-free elastomer within 15 minutes. The elastomer is found to be a valuable insulating material.

Example 2

There is added under substantially anhydrous conditions, 0.6 part of tris(N,N-dimethyl-N'-methylureido)-methylsilane to a mixture of 10 parts of a silanol-terminated diorganopolysiloxane consisting essentially of chemically combined dimethylsiloxy units and diphenylsiloxy units having a viscosity of about 3,000 centipoises at 25° C. and 1 part of fumed silica. During the addition, the mixture is constantly stirred. A tough tack-free opaque elastomer is obtained within one hour when the composition is exposed to atmospheric moisture. It remains in a fluid pourable state for an indefinite period of time when protected from atmospheric moisture.

Example 3

There was added 0.4 part of bis(N,N-dimethyl-N'-methyluriedo)methylsilane to 40 parts of a silanol-terminated dimethylpolysiloxane having a viscosity of about 2800 centipoises at 25° C. The addition was performed at 25° C. under substantially anhydrous conditions utilizing nitrogen. While the mixture was stirred rapidly, an additional 0.2 part of the silane was added after about an hour. A further increment of 0.2 part of the silane was then added an hour later. After exposing the resulting composition to the atmosphere for several hours, there was obtained a tack-free cross linked gum exhibiting valuable insulating properties.

Example 4

There was added 1 part of tris(N,N-dimethyl-N'-methyluriedo)tert-butoxysilane to 10 parts of the silanol-terminated dimethylpolysiloxane utilized in Example 3. The addition was performed at 25° C. under atmospheric conditions. A tack-free composition was obtained in about 4 hours. When cure was effected in contact with aluminum, a silicone rubber-aluminum composite was obtained having excellent rubber to metal adhesion.

Example 5

There was mixed under atmospheric conditions 0.75 part of tris(N-isopropyl-N'-allyluriedo)phenylsilane with 10 parts of the silanol-terminated dimethylpolysiloxane of Example 3. The resulting composition was tack-free in two hours. There was obtained an elastomer having valuable insulating properties.

While the foregoing examples have of necessity been limited to only a few of the very many variables within the scope of the present invention, it should be understood that the present invention is directed to a much broader class of uriedosilane as shown by Formula 1 and silanol-terminated organopolysiloxane consisting essentially of chemically combined units of Formula 2.

What I claim as new and desire to secure by Letters Patent of the United States is:

1. A curable composition which is stable for an indefinite period of time when maintained under substantially anhydrous conditions comprising by weight (1) 100 parts of a silanol-terminated organopolysiloxane consisting essentially of chemically combined units of the formula,

and (2) from 2 to 30 parts of a uriedosilane of the formula:

where R is selected from the class consisting of monovalent hydrocarbon radicals, halogenated monovalent hydrocarbon radicals and alkoxy radicals, R' is selected from monovalent hydrocarbon radicals and halogenated monovalent hydrocarbon radicals, R'' is selected from hydrogen and R' radicals, R''' is selected from R' radicals and cyanoalkyl radicals, and $a$ is equal to 0 or 1.

2. A composition in accordance with claim 1, where $a$ is 0.

3. A composition in accordance with claim 1, where $a$ is 1.

4. A composition in accordance with claim 1, where R is a monovalent hydrocarbon radical.

5. A composition in accordance with claim 1, where R is an alkoxy radical.

6. A composition in accordance with claim 1, where said silanol-terminated organopolysiloxane consists essentially of chemically combined dialkylsiloxy units.

7. A composition in accordance with claim 1, where R is selected from the class consisting of methyl, phenyl, and tert-butoxy, R' is selected from the class consisting of methyl and phenyl, R'' is selected from the class consisting of methyl and hydrogen and R''' is a member selected from the class consisting of methyl, a mixture of methyl and phenyl, and a mixture of methyl, vinyl and cyanoethyl.

8. A curable composition in accordance with claim 1, where said silanol-terminated organopolysiloxane is a silanol-terminated polydimethylsiloxane.

9. A curable composition in accordance with claim 1, where said uriedosilane is tris(N,N-dimethyl-N'-phenyluriedo)methylsilane.

10. A curable composition in accordance with claim 1, where said uriedosilane is bis(N,N-dimethyl-N'-methyluriedo)methylsilane.

References Cited
UNITED STATES PATENTS 3,172,874  3/1965  Klebe _____ 260—77.5
3,208,971  9/1965  Gilkey et al. _____ 260—46.5

DONALD E. CZAJA, *Primary Examiner.*

M. I. MARQUIS, *Assistant Examiner.*